United States Patent [19]

MacCready, Jr.

[11] 4,219,887
[45] Aug. 26, 1980

[54] BISTATIC ACOUSTIC WIND MONITOR SYSTEM

[75] Inventor: Paul B. MacCready, Jr., Pasadena, Calif.

[73] Assignee: Aerovironment Inc., Pasadena, Calif.

[21] Appl. No.: 948,322

[22] Filed: Oct. 4, 1978

[51] Int. Cl.² .................... G01S 9/66; G01W 1/02
[52] U.S. Cl. ........................... 367/90; 73/189; 73/861.1 B; 343/5 W
[58] Field of Search ............ 73/170 R, 189, 194 A; 340/1 R, 3 D; 367/90; 343/5 W

[56] References Cited

U.S. PATENT DOCUMENTS

| | | | |
|---|---|---|---|
| 3,675,191 | 7/1972 | McAllister | 367/90 X |
| 3,889,533 | 6/1975 | Balser | 73/189 |
| 4,143,547 | 3/1979 | Balser | 367/90 X |

OTHER PUBLICATIONS

Singal et al., Indian Journal of Radio and Space Physics, vol. 4, No. 2, pp. 146-156, Jun. 1975.
Asimakopoulos et al., Journal of Physics E, vol. 10, No. 1, pp. 47-50, Jan. 1977.

*Primary Examiner*—Richard A. Farley
*Attorney, Agent, or Firm*—William W. Haefliger

[57] ABSTRACT

In a Doppler acoustic radar system, bistatic transmitting and receiving antennas are employed in a manner to significantly improve wind measurement performance, and to simplify equipment deployment.

31 Claims, 9 Drawing Figures

BISTATIC ACOUSTIC WIND MONITOR SYSTEM

BACKGROUND OF THE INVENTION

This invention relates generally to Doppler acoustic echo sounder (or acoustic radar) systems (also called Doppler sodar or Doppler acdar or Doppler echosonde systems), and more particularly concerns the employment of bistatic transmitting and receiving antennas in such manner as to significantly improve wind measurement performance of the system, and to simplify equipment deployment. The term "acoustic radar" as used herein refers to an acoustic echo sounder.

A Doppler bistatic acoustic wind monitoring system of the pulse type transmits an acoustic pulse upward along a first beam A (defined by the transmit antenna pattern), and then listens for and analyzes echoes returned from atomspheric scatterers. The listening is accomplished along a beam B defined by the receive antenna pattern. A and B beams must be coincident, at least at the scatter range being investigated; in fact, in a monostatic (MS) system, the beams are everywhere coincident because the same antenna is used first as the transmitter and then as the receiver. A bistatic (BS) system is defined as one in which A and B beams are not everywhere coincident.

The Doppler frequency shift of the returned signal is found to be proportional to the component of the velocity of the scatterers along a line bisecting the angle made by the lines extending from the scatterers to the receive antenna and to the transmit antenna. The scatterers are small scale temperature and velocity anomalies that move generally with the local wind. The location and size of the region of the scatterers are determined by the beam geometry (beam width at scatter zone, etc.), by the time interval between transmission of the acoustic pulse and receipt of the echoes, by the pulse length, and by the time constraints in the spectrum analyzer device. Thus, for one set of antennas and beams A and B, it is possible to obtain one velocity component for the local region; for a second antenna pair with different orientation a second velocity component can be found; and a third antenna system will yield a third velocity component. If three components can be found for the same height region, and if the atmosphere can be expected to be horizontally homogeneous, then even if the sensed regions are somewhat displaced horizontally, a representative wind vector V can be derived from the three components (or from two components if we assume the wind is horizontal) using geometrical relationships.

Temperature variations within the sensed region cause back scatter of sound generally at all angles toward the transmitted beam (although not at right angles to the beam); velocity variations do likewise, except for angles around 180° (backscatter direction). Thus, if there is turbulence but no temperature microstructure at the scatter region, a monostatic antenna system will not receive echoes, but a bistatic antenna system will. On the other hand, conventional bistatic systems require excessive spacing of the transmit and receive antennas for surveys of higher scatter regions; also, one of the antennas must be of sufficiently wide beam or have several beams in a fan orientation so as to permit surveys of scatter regions throughout a range of heights.

There are various complex relations between the scattering sensitivity, beam geometry, range, and ambient noise which enter the evaluation of what beam systems will give the best signal/noise ratio, and hence the best range, in a particular meteorological situation—and, for the deviation of a wind vector, there are further considerations of the accuracy consequences pertaining to the geometric relationships between the observed components and the total wind. See in this regard, "Review of Geophysics and Space Physics" Volume 16, No. 1, February 1978, and "Journal of Geophysical Research", Volume 79, No. 36, Dec. 20, 1974, pages 5585–5591. These and other considerations demonostrate the need for simplification of the equipment needed to achieve high performance.

SUMMARY OF THE INVENTION

It is a major object of the invention to provide a bistatic system which offers features of simplicity, accuracy, and high signal/noise ratio. A key feature of the system is that it retains much of the simplicity of a monostatic system yet achieves performance of a bistatic system. Also, very little additional or different software is required for the analysis of the Doppler signals and the construction of the wind components in the desired coordinate system. The relation of the bistatic to the monostatic system is so close that it becomes possible to operate in monostatic mode at low altitudes and bistatic mode at high altitudes, and thus cover a large altitude range while utilizing each mode where it has particular advantages.

Basically the system is embodied in a combination that comprises:

(a) a first transmitting antenna or transducer $T_1$ oriented to transmit acoustic radar beams toward an atmospheric locus of wind moving with velocity characterized by vector $\overline{V}$, (b) a first receiving antenna or transducer $R_1$ oriented to receive acoustic radar echo beam signals from said locus for processing to enable detection of a component of the velocity vector $\overline{V}$, (c) the antennas or transducers having beam characteristics and orientations such that the center of the beam pattern from one (the beam center path) intersects the center of the beam pattern of the other with relatively small angularity.

As will be seen, the reduced angularity is typically less than 25°. With the two beams $T_1$ and $R_1$ being relatively narrow (called pencil beams) and with the beam patterns being symmetrical (mirror images), the region of beam coincidence is not wide and the wind component being sensed in the region of greatest sensitivity at each range is in the same direction at each range. In fact, the velocity component sensed most strongly is everywhere along the bisector line, equidistant between the centers of the beams. With conventional bistatic system having non-symmetrical transmit - receive beam configurations, the velocity component at different ranges has different directions. The wind component sensed by a monostatic system is in the same direction at all ranges. The bistatic system which utilizes the monostatic antenna for either transmit or receive can be given a configuration which senses the wind component along approximately the same elevation angle as the monostatic system sensed (although at a different azimuth). This feature lets the data-handling techniques of a monostatic system be used for a bistatic which incorporates the monostatic antennas.

The reduced angularity of the beams means that the region of coincidence of the pencil beams can be long. This is a desirable feature for a Doppler acoustic radar.

Each sensing plane (defined as the plane containing $T_1$, $R_1$, and the point of intersection of the two beams) is typically from vertical in a configuration which is sensing a component of the horizontal wind and which has the sensed component directions at approximately the same elevation angle of the beam from either $T_1$ or $R_1$. The sensing plane can be vertical for a bistatic system.

Additional objects include the provision of a first set of transmit and receive antennas $T_1$ and $R_1$, and a second set of such antennas $T_2$ and $R_2$, each set oriented to define beam center paths with relatively small angularity therebetween, and the antennas $T_2$ and $R_2$ being azimuthally offset from $T_1$ and $R_1$ in such manner that wind velocity vector components may be determined to enable determination of a true wind velocity vector $\overline{V}$, in a horizontal plane.

These and other objects and advantages of the invention, as well as the details of an illustrative embodiment, will be more fully understood from the following description and drawings, in which:

DRAWING DESCRIPTION

DETAILED DESCRIPTION

1. Technical Background

Figure 1:
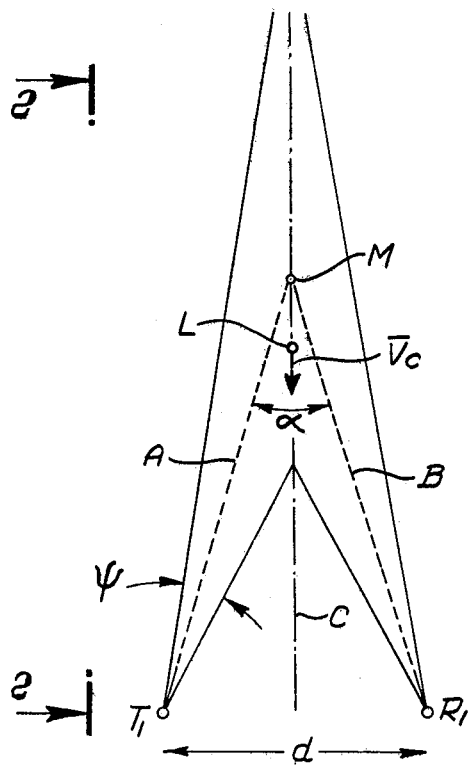
FIG. 1 is a frontal elevation showing transmit and receive antennas with a perpendicular bisector plane.

The velocity of the wind can be measured by transmitting sound into the atmosphere and then listening for echoes generated by the scattering of the sound by turbulence anomalies. The frequency of the detected echoes may be different from that of the transmitted signal if the turbulence field is moving in relation to the transmitter or receiver. Since the turbulence is carried along with the atmosphere, this movement is equivalent to the wind velocity.

The relation between the change in frequency and the geometry of the transmitting, receiving, and velocity directions can be expressed as:

$$V = c\Delta f/2f \cos \phi \qquad (1)$$

where V is the velocity component along the bisector line (the line midway between the transmit and receive paths), f is the frequency of the transmitted signal, $\Delta f$ is the Doppler shift, c is the speed of sound in the medium and $2\phi$ is the angle between the transmit and receive paths.

The equation shows that the frequency shift is proportional to the magnitude of the velocity vector component lying along the angle bisector of the transmit and receive directions.

The operation of a Doppler acoustic radar is dependent upon receiving an echo with an amplitude sufficiently greater than the background noise to permit the accurate determination of its frequency content. The amplitude of the echo can be expressed as the received power, $P_r$, which is given by the following equation:

$$P_r \propto \frac{\sigma}{R^2}, \qquad (2)$$

for a system operating at a given transmitted power level, a given transmitted pulse length, a given antenna size and efficiency, and under fixed conditions of atmospheric attenuation. In this equation, $\sigma$ is the portion of the transmitted power scattered back into a unit solid angle from a unit volume, and R is the distance from the transmitting and receiving antennas to the scattering medium.

The scattering coefficient, $\sigma$, is related to the level of atmospheric turbulence and the geometry of the acoustic radar system in accordance with the expression:

$$\sigma \propto \cos^2 \phi \left(\frac{\phi}{2}\right)^{-11/3} \left(\frac{C_v^2}{C^2} \cos^2 \frac{\phi}{2} + 0.13 \frac{C_T^2}{T^2}\right) \qquad (3)$$

where $C_v^2/C^2$ is the normalized velocity structure function, $C_T^2/T^2$ is the normalized temperature structure function, and $\phi$ is the scattering angle, the angle between the transmitted and received directions. T is temperature. C is the speed of sound.

The accuracy of the velocity component measurement is proportional to the accuracy of the measurements of the frequency shift, and the proportionality constant is a function of the geometry. In the presence of ambient noise the accuracy of the frequency measurement is related to the signal amplitude which is also a function of the geometry. It is clear that the effectiveness of a Doppler acoustic radar wind measuring system is closely tied to geometrical configuration of the transmitting and receiving antenna beams.

2. System Description

Figure 2:
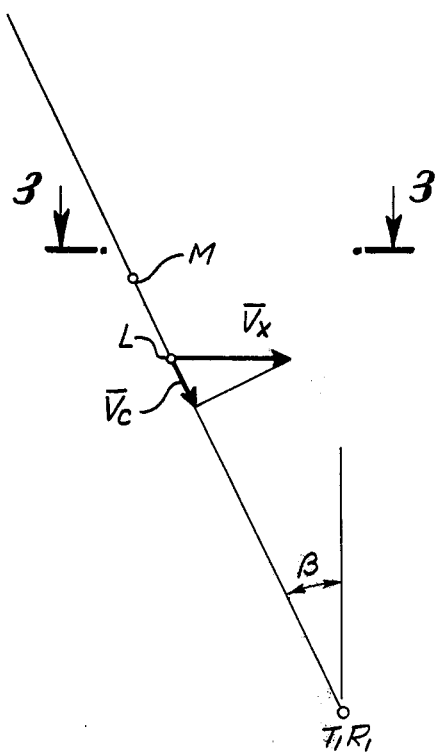
FIG. 2 is a side elevation taken on lines 2—2 of FIG. 1.
Figure 3:
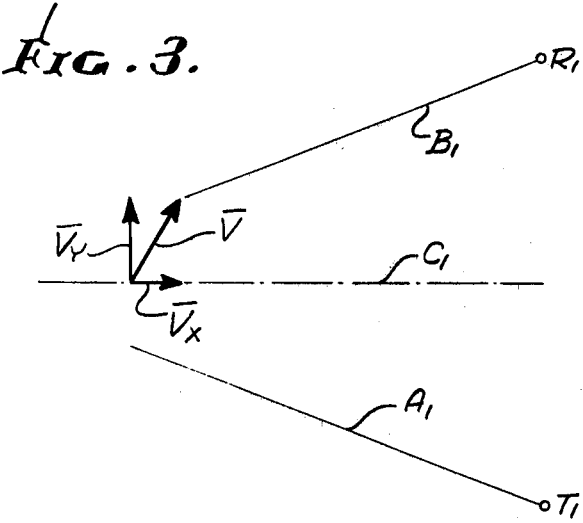
FIG. 3 is a plan view taken on lines 3—3 of FIG. 2.
Figure 4:
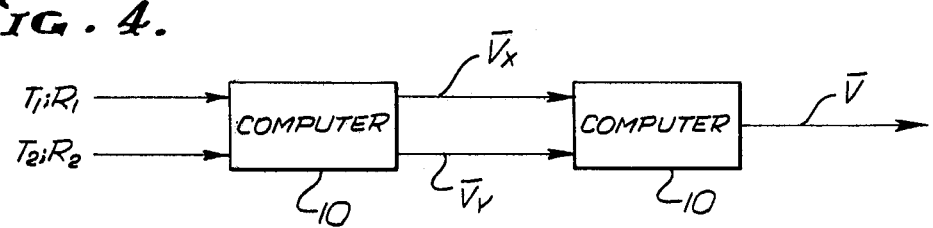
FIG. 4 is a representation of derivation of a wind vector $\overline{V}$.

In FIGS. 1-3, transmit and receive antennas $T_1$ and $R_1$ are shown at ground level and oriented so that $T_1$ transmits acoustic radar beams, with beam centerline designated by A, toward an atmospheric locus L moving with velocity characterized by vector $\overline{V}$. The latter is seen to have components $\overline{V}_x$ and $\overline{V}_y$, in FIG. 3. The receiving antenna $R_1$ is oriented with its centerline designated by B, intersecting A at point M. $R_1$ receives acoustic radar echo beam signals from locus L, for processing to enable detection of one component of $\overline{V}$. As shown in FIGS. 3 and 4, $T_1$ and $R_1$ are used to determine component $\overline{V}_x$ which extends along a bisector line C. L is spaced on or near line C and need not coincide with M. (Another set of antennas $T_2$ and $R_2$ is used to determine $\overline{V}_y$, as will appear). The term "antenna" as used herein refers to a transducer.

The antennas $T_1$ and $R_1$ are oriented to define beam center paths A and B with relatively small angularity $\alpha$ therebetween. Typically, $\alpha$ is less than about 25°, for best results; thus, under these conditions, there is substantial range over which there is overlap between the "pencils" defined by the beams transmitted from $T_1$ and received by $R_1$. The centers of such pencils are defined by A and B. Line C in FIGS. 1 and 3 bisects the angle $\alpha$. A "pencil" exists when, for example, the beam cone transmitted by $T_1$ defines a cone angle $\psi$ less than about 15° between the half power points.

It will also be noted that the sensing plane, which includes beams A and B and the bisector line C, is tilted from vertical, in order that $\overline{V}_x$ may be detected (see FIG. 2). For best results, in measuring a horizontal wind component, the tilt angularity $\beta$ is greater than about 10°, from the vertical, is less than 45°, and may typically be about 30°.

Figure 5:
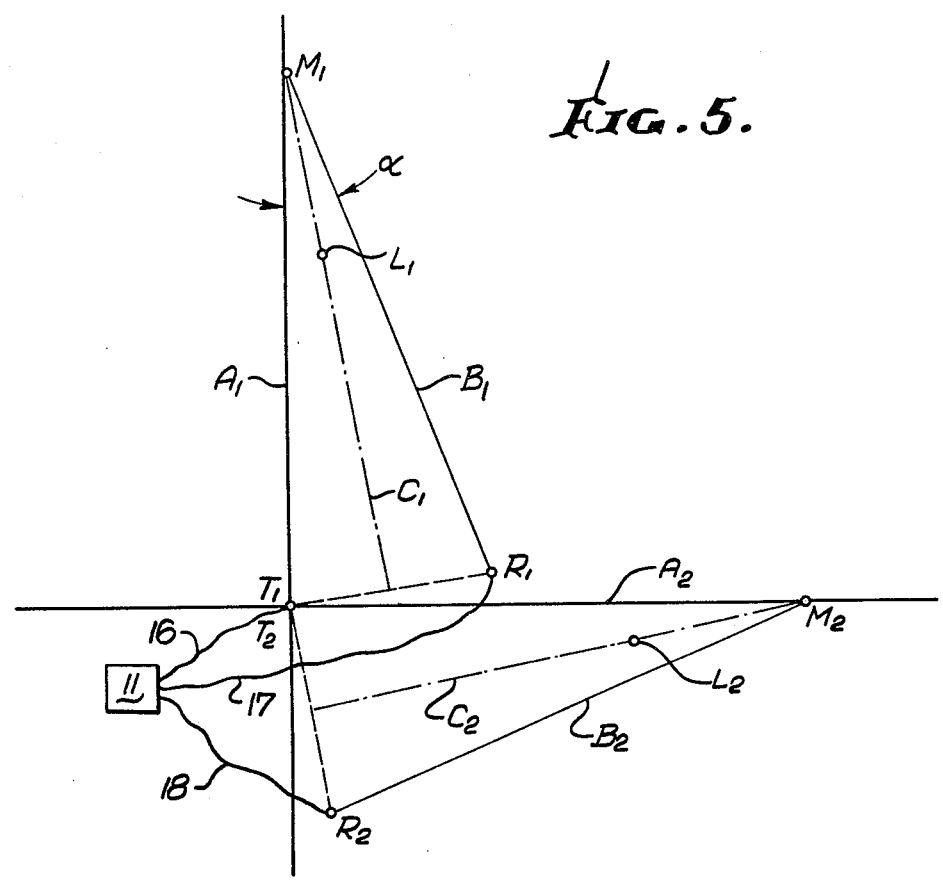
FIG. 5 is a plan view of a system embodying the invention; and employing two sets of transmit and receive antennas.

FIG. 5 shows a bistatic system wherein antennas $T_1$ and $R_1$ are employed, as described above. A similar set of antennas $T_2$ and $R_2$ is also employed, to derive $\overline{V}_y$. $T_1$ and $T_2$ are shown as at the same location, and $R_2$ is azimuthally offset from $R_1$. In FIG. 5, $R_2$ is offset 90°, azimuthally, from $R_1$.

In a typical example the beams $A_1$ from antenna $T_1$ points upwards 60° at an azimuth of 000°. The $B_1$ beam antenna $R_1$ is moved to a location 210 m distant from $T_1$ at an azimuth of 75° and pointed up 60° in a direction so the beam center intersects the A beam center at 700 m height point $M_1$. The component observed, approximately along the bisector line $C_1$, is at an elevation angle of 60.9° and an azimuth of 345°. The centerlines of the beams intersect at an angle $\alpha$ which is 15°. If the pencil beams are about 10° wide between their associated half power points, there is a long range of some coincidence of the beams $A_1$ and $B_1$, from which echoes can be expected. To complete the two-component system, beam $A_2$ from antenna $T_2$ points up 60° at an azimuth of 90°, and the $B_2$ beam antenna $R_2$ is set out 210 m at an azimuth of 165°, pointed up 60° to intersect the $A_2$ beam center a 700 m height point $M_2$. The velocity component observed with the $A_1 - T_1$, antenna pair is at an elevation angle of 60.9° and an azimuth of 345°, while that from the $A_2 - T_2$ pair has an azimuth of 75°. These two components are orthogonal in the horizontal plane, and together define $\overline{V}$. $T_2$ may be offset from $T_1$ so long as the line between $T_2$ and $R_2$ is perpendicular to the line between $T_1$ and $R_1$, so long as the range of $R_2$ from $T_2$ and of $R_1$ from $T_1$ are the same, and so long as winds at $L_1$ and $L_2$ are, as a practical matter traveling at the same velocities $\overline{V}$.

If the same data reduction algorithms are used for deriving wind components from the echoes of this new system as for deriving them from the old MS system, the wind will be almost correctly ascertained, except for a constant 15° azimuth correction which is to be subtracted from every azimuth reading. There are several additional small errors, and corrections can be made for them; but they are so small that they are generally insignificant in comparison to other errors inherent in acoustic Doppler systems and can be ignored.

One such small error is due to the fact the bisector line $C_1$ (and also line $C_2$) is at an elevation angle at 60.86° rather than the 60.00° of the original A-B beams. If the wind geometry algorithm with 60° is used for the bistatic mode, the wind component will be indicated to be 1% weaker than actual. A logical correction technique would be to tilt all antennas 59.6° instead at 60°, and use the same 60° algorithm for data reduction in both the MS and BS modes; each would be then be in error by only about ½%.

Another small error arises because the Doppler shift obtained with bistatic antennas is less as the observed scattering angle increases. For the geometry described herein, at altitudes exceeding 700 m (scatter angles less than 15°) the decrease in Doppler shift is less than 1% and so the indicated velocity component is low by less than 1%. Even at a height of 350 m the effect is under 3.5%.

Another error lies in the fact that the length of the path from $T_1$ to the scatterer locus L to $R_1$ is altered when $T_1$ and $R_1$ are separated in the bistatic mode as contrasted with the situation when they are co-located in the monostatic mode; this effect, plus the difference in elevation angle for the acoustic beams between the modes, means that a time gate will represent a slightly different height for the two modes. There is no differences at a height of 700 m, and differences are only about 9 m at heights of 350 m and 1400 m.

3. Variations

For any system the role of the transmitters and receivers can be reversed without altering the principles involved.

The particular example described above is for a bistatic system with antennas $T_1$ and $R_1$ (and $T_2$ and $R_2$) separated by 210 m, set at an elevation angle of 60°, and pointed so the beam centerlines intersect at an angle of 15° at a height of 700 m. If the T-R separation distance "d" is decreased, the pencil beams will overlap more over a longer range of distances (altitudes), which is desirable, but the scattering angles for each height will be less than for the example, which decreases the amount of echo received from the scatterer. For instance, a lesser antenna separation will require the azimuth of antenna $R_1$ to be altered (to greater than 75° but less than 90°), and the azimuth of the bisector line C will be closer to the azimuth of antenna $T_1$. Of course, the system can be adapted to shorter ranges by preserving all angles but decreasing all dimensions proportionally.

Accordingly, there are various compromise configurations which are practical and meet the main objective of having a bistatic system which invokes similar geometry and uses similar algorithms to those used in the monostatic system. For example, receiver $R_1$ can be put 183.3 m out at an azimuth of 83.5°, pointing up to intersect beam $A_1$ at 700 m and an angle of 13°. The bisector $C_1$ turns out to be at an elevation angle of 60°, the same as beam $A_1$ (and azimuth of 353.5°). Beam B will be at an elevation angle very close to 60°, and the range from $R_2$ to the intersection point M or the locus L will be very close to that from A to the intersection point or locus. Various other configurations can be used, with the elevation angles of $T_1$, $R_1$ and the bisector $C_1$ being so similar that in a practical application the differences can be ignored, and with the acoustic leg lengths from $T_1$ and $R_1$ being so nearly similar that the differences have no practical consequence.

Ordinarily, the system will be operated in both MS and BS modes. For example, during a five-minute period, operate in a sequence giving fast repetitions of the monostatic pulses to handle low altitudes, and slower repititions of the bistatic pulses to handle the high altitude. See FIG. 4 in this regard, using computer 10. Print out winds in 33 m height gates from 67 m to 400 m from the monostatic mode, and winds from 400 to 1500 m in the bistatic mode. The redundant measurement at 400 m serves as a consistency check. Representative pulse frequencies are 1,000 to 4,000 Hertz; repetition rates are 1 second to 10 seconds; and pulse durations are 20 milliseconds to 400 milliseconds.

The discussion has assumed each beam to be a narrow, pencil-beam, symmetrical about its centerline, with a width of about 10° between the 3 db or 6 db power points. The beam can be made narrower or wider or be asymmetrical about its own centerline.

Figure 6:
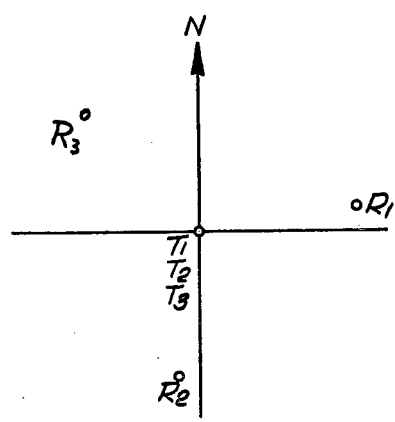
FIG. 6 is like FIG. 5 but showing three sets of T and R antennas.

A three-component monostatic system can be made by using three beams at elevation angles of 60° and azimuths of 000, 120, and 240, from co-located antennas. See $T_1$ and $R_1$; $T_2$ and $R_2$; and $T_3$ and $R_3$ in FIG. 6. This can be merged into a combined monostatic-bistatic system by adding three more pencil-beam transmitters at 210 m distances and azimuths of 75, 195 and 315°. These geometries constitute a symmetrical system. Asymmetrical variations can also be employed. For example, to the basic-two-component system discussed herein, add another antenna pair handling the W sector ($T_3$ pointing at an azimuth of 270°; $R_3$ being at an azimuth of 345° at a range of 210 m).

It should be noted that with a three-component system, the elevation angles can be increased (say, to 70°) while still retaining adequate accuracy for horizontal wind observations. With different elevation angles, the azimuth orientations of the extra bistatic transmitters must be altered somewhat.

As noted, the remote antennas can be either transmitting or receiving. If they are receiving, they do not require much power—and in fact could be made battery powered with telemetering of the received echo signals.

In FIG. 5, item 11 represents circuitry to transmit pulses to $T_1$ and $T_2$ and to receive pulses from $R_1$ and $R_2$ to reduce the data. See for example the circuitry in U.S. Pat. No. 3,675,191 to McAllister. Bus connections appear at 16–18.

Also in FIG. 5, in MS mode, $T_1$ represents both a transmitter and receiver.

Figure 9:
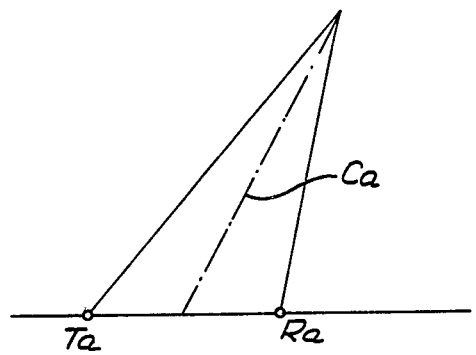
FIG. 9 is a side view of a bistatic configuration for an antenna pair with the sensing plane vertical.
Figure 8:
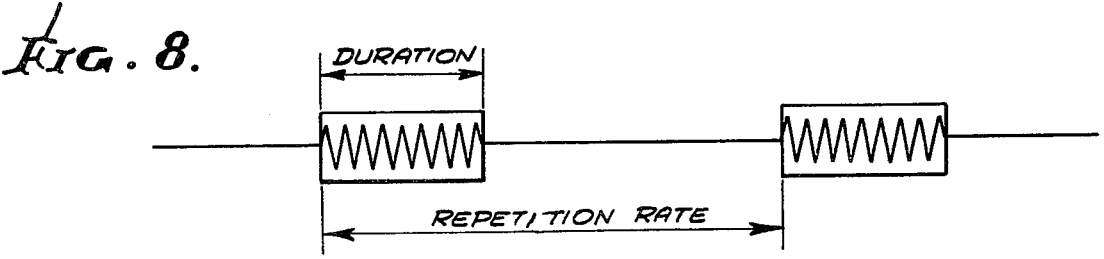
FIG. 8 is a waveform diagram.

In the above, and generally speaking, $C_1$ is perpendicular to the lines connecting $T_1$ and $R_1$, but $C_1$ can in some cases be tilted from such perpendicularity. FIG. 9 shows such a case where the sensing plane is vertical and $C_a$, the bisector line for transmitter $T_a$ and receiver $R_a$ is not vertical. FIG. 9 can also represent the case where the ground is tilted and $C_a$ is vertical when viewed frontally in the sensing plane, but the sensing plane is tilted from the vertical. All these bistatic configurations can be used to augment monostatic acoustic radar of a type producing facsimile charts, the bistatic mode augmenting echoes, over a long range of coincidence.

Figure 7:
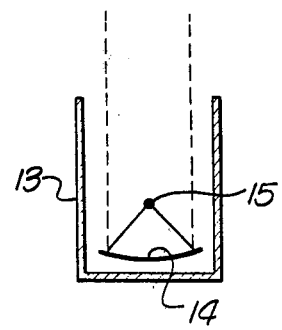
FIG. 7 is a side elevation showing the antenna.

FIG. 7 diagrammatically shows a section through a transmitter, with housing 13, antenna dish 14, and sound wave emitter 15.

I claim:

1. In a Doppler acoustic echo sounder system, the combination comprising
   (a) a first transmitting transducer $T_1$ oriented to transmit acoustic beams toward an atmospheric locus of wind moving with velocity characterized by vector $\overline{V}$,
   (b) a first receiving transducer $R_1$ oriented to receive acoustic echo beam signals from said locus, for processing to enable detection of one component of the wind velocity vector $\overline{V}$,
   (c) said transducers oriented to define beam center paths with relatively small angularity therebetween,
   (d) the plane containing $T_1$, $R_1$ and the beam center paths being tilted from vertical.

2. The combination of claim 1 wherein said angularity is less than about 25°.

3. The combination of claim 1 wherein said plane is tilted from vertical by angularity greater than about 10°.

4. The combination of claim 3 wherein each of the beams associated with $T_1$ and $R_1$ is narrower than about 15° between its half power points.

5. The combination of claim 4 wherein said tilt angularity is about 30°.

6. The combination of claim 1 wherein said beams are pencil beams.

7. The combination of claim 1 wherein the beams associated with $T_1$ and $R_1$ are narrower than 15° between their associated half power points.

8. The combination of claim 6 wherein the beams associated with $T_1$ and $R_1$ are narrower than 15° but wider than 7° between their associated half power points.

9. In a Doppler acoustic echo sounder system, the combination comprising
   (a) a first transmitting transducer $T_1$ oriented to transmit acoustic beams toward an atmospheric locus of wind moving with velocity characterized by vector $\overline{V}$,
   (b) a first receiving transducer $R_1$ oriented to receive acoustic echo beam signals from said locus for processing to enable detection of one or more components of the wind velocity vector $\overline{V}$,
   (c) said transducers oriented to define beam center paths in a plane tilted from vertical.

10. The combination of claim 9 wherein said plane is tilted from vertical by angularity greater than about 10°.

11. The combination of claim 10 wherein said tilt angularity is about 30°.

12. The combination of claim 11 wherein the beams associated with $T_1$ and $R_1$ are narrower than about 15° between their associated half power points.

13. The combination of claim 9 wherein the beams associated with $T_1$ and $R_1$ are pencil beams.

14. The combination of claim 13 wherein the beams associated with $T_1$ and $R_1$ have substantial overlap along their lengths.

15. The combination of claim 14 wherein the beams associated with $T_1$ and $R_1$ are narrower than about 15° between their associated half power points.

16. In a Doppler acoustic echo sounder system, the combination comprising
   (a) a first transmitting transducer $T_1$ oriented to transmit acoustic beams toward an atmospheric locus $L_1$ of wind moving with velocity characterized by vector $\overline{V}$,
   (b) a first receiving transducer $R_1$ oriented to receive acoustic echo beam signals from said locus for processing to enable detection of one or more components of the wind velocity vector $\overline{V}$,
   (c) said transducers $T_1$ and $R_1$ oriented to define beam center paths with relatively small first angularity therebetween,
   (d) a second transmitting transducer $T_2$ oriented to transmit acoustic beams toward an atmospheric locus $L_2$ of the wind moving with velocity characterized by vector $\overline{V}$, $L_1$ and $L_2$ being at approximately the same elevation,
   (e) a second receiving transducer $R_2$ oriented to receive acoustic echo signals from said locus $L_2$, for processing to enable detection of one or more components of the velocity vector $\overline{V}$,
   (f) said transducers $T_2$ and $R_2$ oriented to define beam center paths with relative small second angularity therebetween,
   (g) said transducer $R_2$ being azimuthally offset from said transducer $R_1$, (h) the plane defined by the center beam paths of $T_1$ and $R_1$ being tilted from vertical, and the plane defined by the center beam paths of $T_2$ and $R_2$ being tilted from vertical.

17. The combination of claim 16 wherein $R_2$ is azimuthally offset from $R_1$ by about 90°, and relative to a common location of $T_1$ and $T_2$.

18. The combination of claim 16 wherein each of said first and second angularities is less than about 25°.

19. The combination of claim 16 wherein each of said planes is tilted from vertical by angularity greater than about 10°.

20. The combination of claim 19 wherein the tilt angularities of the planes are approximately equal.

21. The combination of claim 20 wherein said tilt angularities are about 30°.

22. The combination of claim 16 wherein the beams associated with one of $T_1$ and $R_1$, and of $T_2$ and $R_2$, are pencil beams.

23. The combination of claim 22 wherein said beams associated with $T_1$ and $R_1$ have substantial overlap along their lengths, and said beams associated with $T_2$ and $R_2$ have substantial overlap along their lenghts.

24. The combination of claim 16 wherein said beams associated with $T_1$ and $R_1$ are narrower than about 15° between their half power points.

25. The combination of claim 24 wherein said beams associated with $T_2$ and $R_2$ are narrower than about 15° between their half power points.

26. In a Doppler acoustic echo sounder system, the combination comprising
   (a) a first transmitting transducer $T_1$ oriented to transmit acoustic beams toward anatmospheric locus $L_1$ of the wind moving with velocity characterized by vector $\overline{V}$,
   (b) a first receiving transducer $R_1$ oriented to receive acoustic echo beam signals from said locus for processing to enable detection of one or more components of the wind velocity vector $\overline{V}$,
   (c) said transducers $T_1$ and $R_1$ oriented to define beam center paths in a first plane tilted from vertical,
   (d) a second transmitting transducer $T_2$ oriented to transmit acoustic beams toward an atmospheric locus $L_2$ of wind moving with velocity characterized by vector $\overline{V}$, $L_1$ and $L_2$ being at approximately the same elevation.
   (e) a second receiving transducer $R_2$ oriented to receive acoustic echo signals from said locus $L_2$ for processing to enable detection of one or more components of the velocity vector $\overline{V}$, and
   (f) said transducers $T_2$ and $R_2$ oriented to define beam center paths in a second plane tilted from vertical.

27. The combination of claim 26 wherein each of said planes is tilted from vertical by angularity greater than about 10°.

28. The combination of claim 27 wherein the planar tilt angles are approximately equal.

29. The combination of claim 28 wherein the planar tilt angularities are about 30°.

30. The combination of claim 26 wherein $R_2$ is azimuthally offset from $R_1$.

31. In a Doppler acoustic echo sounder system the combination comprising
   (a) a first transmitting transducer $T_1$ oriented to transmit acoustic beams toward an atmospheric locus $L_1$ of wind moving with velocity characterized by vector $\overline{V}$,
   (b) a first receiving transducer $R_1$ oriented to receive acoustic echo beam signals from said locus for processing to enable detection of one or more components of the wind velocity vector $\overline{V}$,
   (c) said transducers $T_1$ and $R_1$ oriented to define center beam paths in a first plane tilted from vertical,
   (d) a second transmitting transducer $T_2$ oriented to transmit acoustic beams toward an atmospheric locus $L_2$ of wind moving with velocity characterized by vector $\overline{V}$,
   (e) a second receiving transducer $R_2$ oriented to receive acoustic echo signals from said locus $L_2$ for processing to enable detection of one or more components of the velocity vector $\overline{V}$, and
   (f) said transducers $T_2$ and $R_2$ oriented to define beam center paths in a second plane tilted from vertical,
   (g) a third transmitting transducer $T_3$ oriented to transmit acoustic beams toward an atmospheric locus $L_3$ of wind moving with velocity characterized by vector $\overline{V}$, $L_1$, $L_2$ and $L_3$ being at approximately the same elevation,
   (h) a third receiving transducer $R_3$ oriented to receive acoustic echo signals from said locus $L_3$ for processing to enable detection of one or more components of the velocity vector $\overline{V}$, and
   (i) said transducers $T_3$ and $R_3$ oriented to define beam center paths in a third plane tilted from vertical.

* * * * *